US011126010B2

(12) United States Patent
Miyashita et al.

(10) Patent No.: US 11,126,010 B2
(45) Date of Patent: Sep. 21, 2021

(54) SPECTACLE FRAME AND TEMPLE THEREOF

(71) Applicant: ZYGOSPEC CO., LTD., Sabae (JP)

(72) Inventors: Tsutomu Miyashita, Sabae (JP); Toshinari Takahashi, Sabae (JP)

(73) Assignee: ZYGOSPEC CO., LTD., Fukui (JP)

( * ) Notice: Subject to any disclaimer, the term of this patent is extended or adjusted under 35 U.S.C. 154(b) by 305 days.

(21) Appl. No.: 16/515,518

(22) Filed: Jul. 18, 2019

(65) Prior Publication Data

US 2020/0033630 A1 Jan. 30, 2020

(30) Foreign Application Priority Data

Jul. 24, 2018 (JP) .............................. JP2018-138201

(51) Int. Cl.
*G02C 5/14* (2006.01)
*G02C 11/00* (2006.01)

(52) U.S. Cl.
CPC .............. *G02C 5/146* (2013.01); *G02C 11/00* (2013.01)

(58) Field of Classification Search
CPC ... G02C 5/14; G02C 3/00; G02C 5/12; G02C 5/00; G02C 11/10; G02C 11/00
USPC ........ 351/123, 121, 111, 155, 140, 156, 158
See application file for complete search history.

(56) References Cited

U.S. PATENT DOCUMENTS

| 3,832,043 A | 8/1974 | Usdan |
| 3,955,885 A | 5/1976 | Aronsohn |
| 5,355,185 A * | 10/1994 | Lee .......................... G02C 3/003 351/123 |
| 6,986,577 B1 | 1/2006 | Jamie et al. |
| 8,287,123 B2 | 10/2012 | Miyashita |
| 2006/0082723 A1 | 4/2006 | Jamie et al. |
| 2010/0283959 A1 | 11/2010 | Miyashita |
| 2016/0266401 A1 | 9/2016 | Wong |
| 2017/0049625 A1 | 2/2017 | Limma |

FOREIGN PATENT DOCUMENTS

| EP | 2 233 963 | 9/2010 |
| JP | 8-211338 | 8/1996 |
| JP | 2001-201721 | 7/2001 |

(Continued)

OTHER PUBLICATIONS

Extended European Search Report dated Jan. 2, 2020 in corresponding European Patent Application 19187942.8.

(Continued)

*Primary Examiner* — Hung X Dang
(74) *Attorney, Agent, or Firm* — Wenderoth, Lind & Ponack, L.L.P.

(57) ABSTRACT

A temple is provided for a spectacle frame without nose pads. The temple comprises an elongate body, and a supporting part. The body has a first end and a second end. The first end is configured to be connected to a front without nose pads. The second end is configured to be mounted on a ear of a wearer. The supporting part is connected to the body, and configured to be mounted a zygomatic region of the wearer. The body has an elongate through hole extending along a longitudinal direction of the body near the second end. Levitation of the second end above the ear of the wearer being prevented by penetration of hair of the wearer through the through hole.

6 Claims, 2 Drawing Sheets

(56) References Cited

FOREIGN PATENT DOCUMENTS

| | | |
|---|---|---|
| JP | 2008-020678 | 1/2008 |
| JP | 3199832 | 9/2015 |
| JP | 1550931 | 6/2016 |
| JP | 1550932 | 6/2016 |
| JP | 2016-206389 | 12/2016 |
| JP | 2018-084666 | 5/2018 |
| JP | 6343744 | 6/2018 |
| KR | 10-2009-0127247 | 12/2009 |
| KR | 10-2013-0113080 | 10/2013 |
| WO | 2011/055541 | 5/2011 |
| WO | 2017/179802 | 10/2017 |

OTHER PUBLICATIONS

Notification of Reasons for Refusal dated Apr. 6, 2021 in corresponding Japanese Patent Application No. 2018-138201 with English translation.

* cited by examiner

SPECTACLE FRAME AND TEMPLE THEREOF

TECHNICAL FIELD

The present invention relates to a spectacle frame.

BACKGROUND ART

JP 1550931 S and JP 1550932 S disclose spectacles with no nose pads. The spectacles have pads provided in the middle of temples. Contact of the pads and the rear end parts of the temples with the temporal regions of a wearer enables to support a front of the spectacles.

SUMMARY OF INVENTION

Technical Problem

Hard exercise may cause the rear ends of the temples to levitate up. This may result in shift or slip of the spectacles.

Solution to Problem

A temple is provided for a spectacle frame without nose pads. The temple comprises an elongate body and a supporting part. The body has a first end and a second end. The first end is configured to be connected to a front without nose pads. The second end is configured to be mounted on a ear of a wearer. The supporting part is connected to the body, and configured to be mounted a zygomatic region of the wearer. The body has an elongate through hole extending along a longitudinal direction of the body near the second end. Levitation of the second end above the ear of the wearer being prevented by penetration of hair of the wearer through the through hole.

The through hole may laterally pierce through the body.

The second end of the body may have a protrusion extending along the longitudinal direction of the body on an upper side thereof. The through hole may pierce through the protrusion.

The supporting part may have an elongate mounting part and an elongate connection part. The mounting part may be configured to be mounted on the zygomatic bone of the wearer, and may have a first end and a second end. The connection part may connects the mounting part to the body, and may have a first end and a second end. The first end of the connection part may be connected to the body near the first end of the body. The second end of the connection part may be located backward, downward and inward with respect to the first end of the connection part. The first end of the mounting part may be connected to the second end of the connection part. The second end of the mounting part may be located forward and downward with respect to the first end of the mounting part.

The supporting part may be formed by a deformable metal member and a resin covering over the metal member.

A spectacle frame may be provided. The spectacle frame may comprise a front without nose pads, and the temple connected to the front.

Advantageous Effects of the Invention

The hair penetrating through the through hole increases resistance against a pivoting movement of spectacles. This enables to prevent shift or slip of the spectacles, even when the wearer takes hard exercise.

The through hole laterally piercing through the body facilitates penetration of the hair through the through hole.

The through hole piercing through the protrusion provided on the upper side of the body facilitates penetration of the hair through the through hole.

The supporting part with the above described shape and/or structure facilitates to conform to a head of the wearer.

DESCRIPTION OF EMBODIMENT

Figure 1:
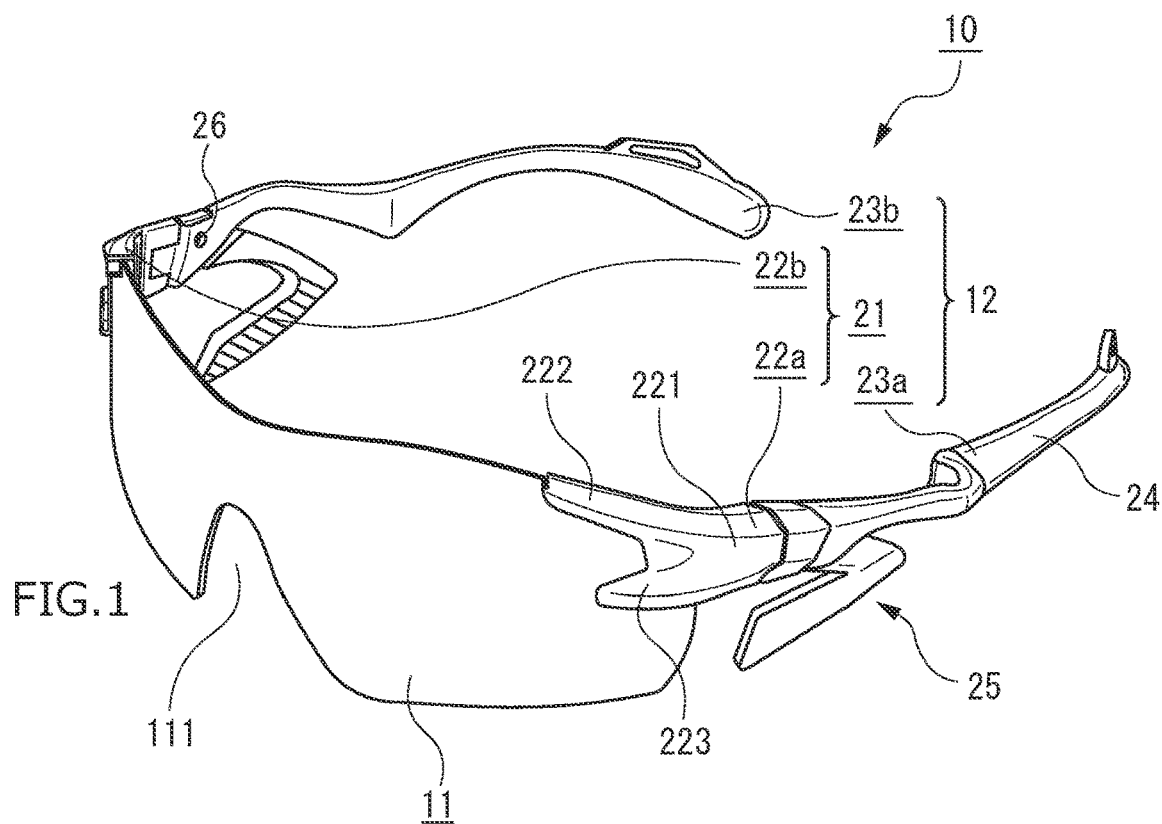
FIG. 1 shows a perspective view of spectacles.

Referring FIG. 1, Spectacles 10 are sunglasses. They have a spectacle frame 12, and lenses 11 supported by the spectacle frame 12.

The lenses 11 are a shading plate without optical correction formed of polycarbonate or other plastics. They have a nose part 111 cut off for avoiding contact with a nose of a wearer.

The spectacle frame 12 has a front 21 supporting the lenses 11, and temples 23a, 23b connected to ends of the front 21.

The front 21 has endpieces 22a, 22b. Each of the endpieces 22a, 22b has a base part 221, an upper part 222 extending from an upper end of the base part 221 toward an inner front side, and a lower part 223 extending from a lower end of the base part 221 toward an inner front side. Each of the base part 221, the upper part 222 and the lower part 223 has a groove for fitting with the lenses 11 to secure the lenses 11 with the front 21.

Figure 2:
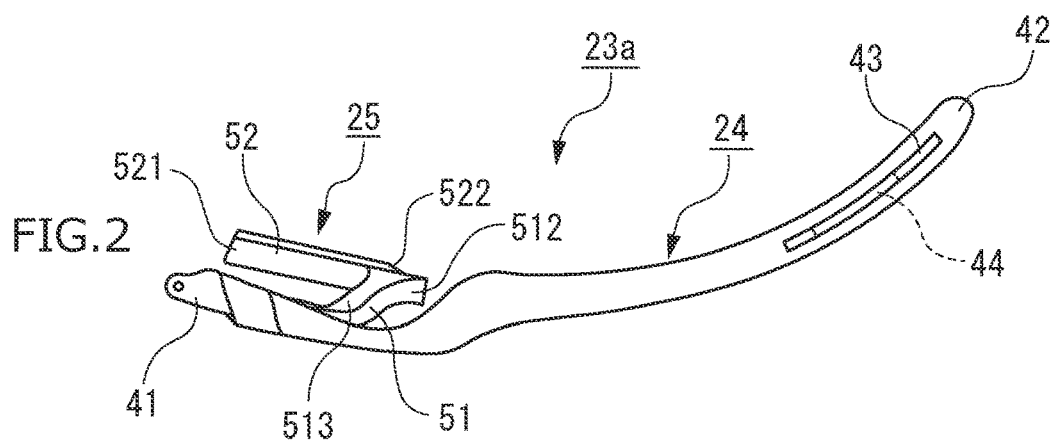
FIGS. 2 and 3 show a plan view and a side view of a temple, respectively.
Figure 3:
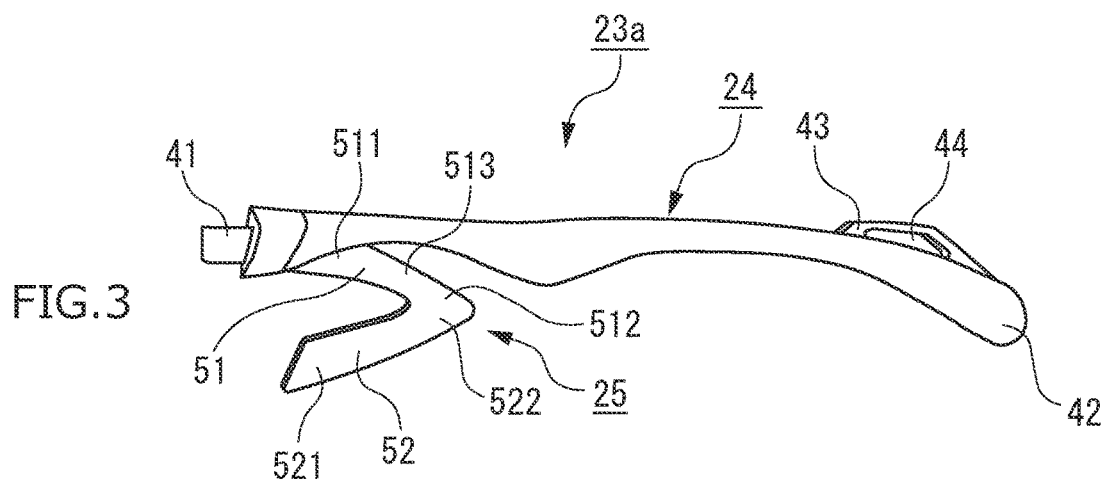
Figure 6:
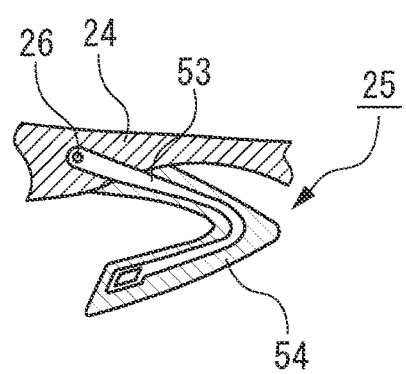
FIG. 6 shows a sectional side view of a supporting part.

Referring FIGS. 2 and 3, the temple 23a has a temple body 24, and a supporting part 25 secured to the temple body 24 with a screw or other securing member 26, illustrated in FIGS. 1 and 6. The temple 23b is a minor image of the temple 23a.

The temple body 24 has a front end 41 and a rear end 42. The front end 41 is connected to the endpiece 22a of the front 21 with a hinge or other connection member to be allowed to pivot on a generally vertical axis for folding. The rear end 42 is mounted on a ear of the wearer.

The temple body 24 has an elongate shape curved generally along a temporal region of the wearer. The temple body 24 may be deformable to conform to a shape and/or a size of a head of the wearer. For example, the temple body 24 may have a thin stainless plate or other deformable metal member, and elastomer or other deformable synthetic resin covering the metal member to follow deformation of the metal member.

The temple body 24 has a protrusion 43 near the rear end 42. The protrusion 43 protrudes upward from an upper face of the temple body 24, and has a elongate plate shape extending along a longitudinal direction of the temple body 24, and a thickness smaller than that of the temple body 24.

Figure 4:
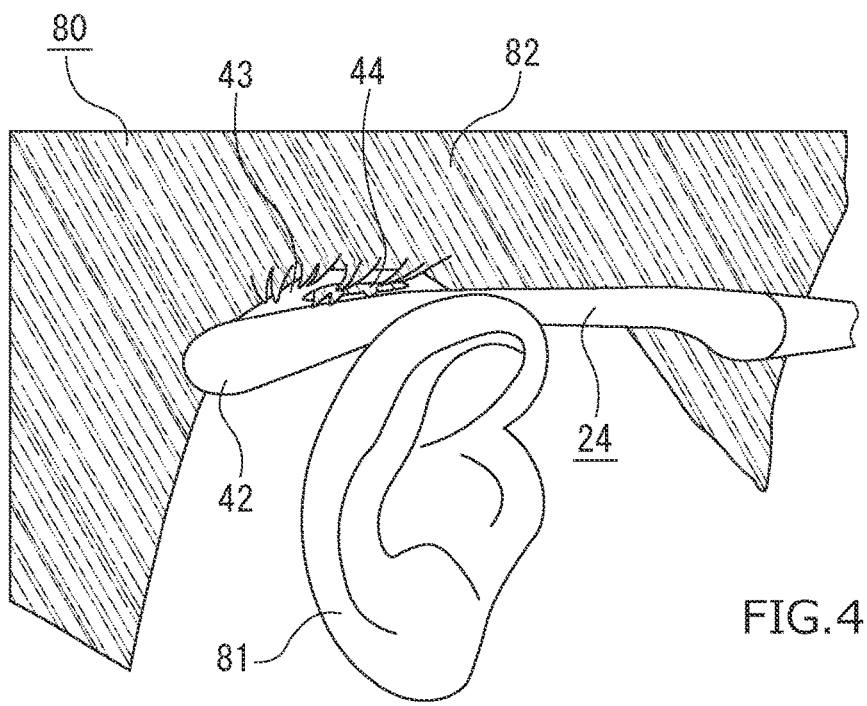
FIGS. 4 and 5 show a side view and a perspective view of a head of a wearer wearing the spectacles, respectively.
Figure 5:
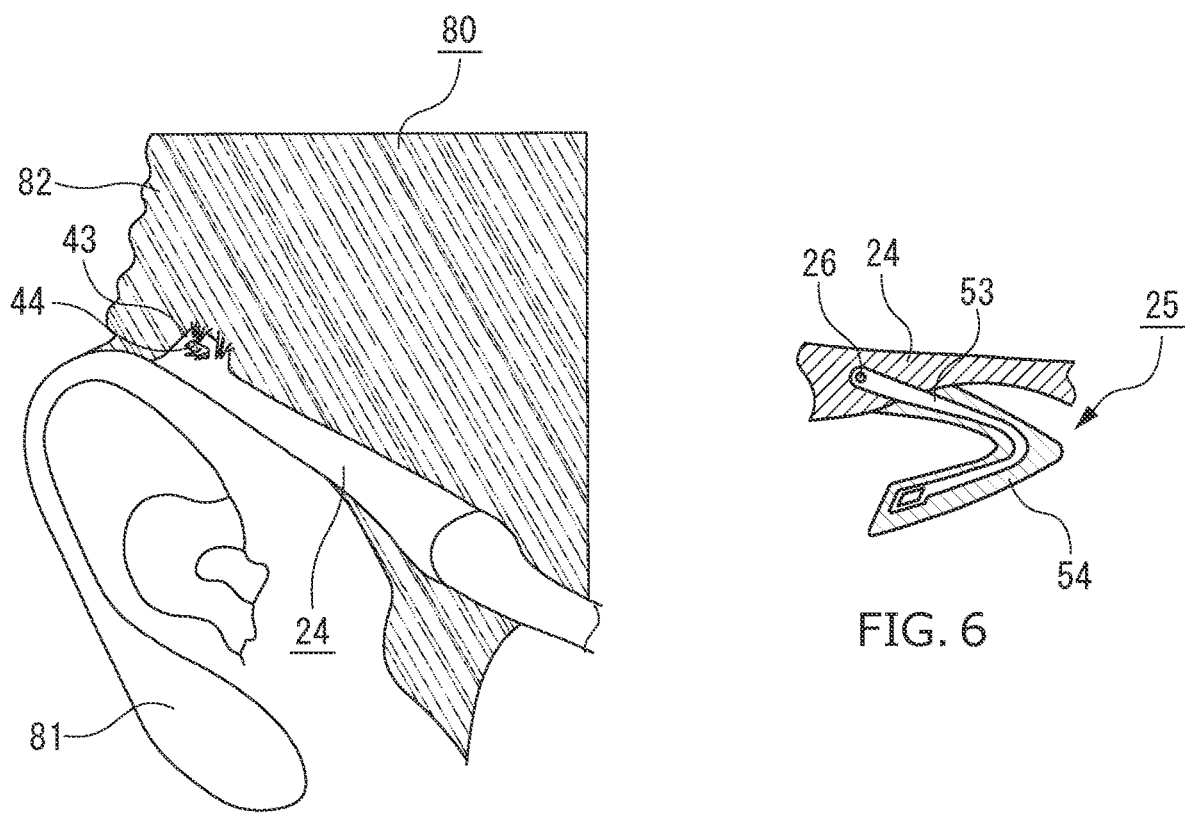

The temple body 24 has a through hole 44 laterally piercing through the protrusion 43. The through hole 44 extends along the longitudinal direction of the temple body 24. The through hole 44 is configured that relatively short hair 82 of the wearer 80 near his ear 81 penetrates through it, as shown in FIGS. 4 and 5.

The supporting part 25 is configured to be mounted on a zygomatic region of the wearer, to support the spectacle 10. The supporting part 25 has a connection part 51 and a mounting part 52.

The connection part 51 connects the mounting part 52 to the temple body 24. The connection part 51 has an elongate shape with a front end 511, and a rear end 512. The front end 511 is connected to the temple body 24 near the front end 41.

A region of the temple body 24 near the front end 41 is apart from the temporal region of the wearer. The connection part 51 extends diagonally toward a lower rear side from the temple body 24, with being curved inward at a curved part 513 to approach the temporal region of the wearer. The curved part 513 is almost directly below the temple body 24, and is backward and downward with respect to the front end 511. The rear end 512 is further backward and downward with respect to the curved part 513, and inward with respect to the temple body 24.

The mounting part 52 is configured to be mounted on the zygomatic region of the wearer. The mounting part 52 has an elongate shape with a front end 521 and a rear end 522. The rear end 522 is connected to the rear end 512 of the connection part 51. The mounting part 52 extends diagonally toward a lower front side from the rear end 522. The front end 521 is forward and downward with respect to the rear end 522.

The mounting part 52 is mounted on skin of the zygomatic region to be supported by a zygomatic bone under the skin. The mounting part 52 may have a rough surface or other structure for slip prevention.

The supporting part 25 may be deformable to confirm to a size of a face and/or a shape of the zygomatic region of the wearer. For example, the supporting part 25 may have a thin titanium plate or other deformable metal member 53, and elastomer or other deformable synthetic resin 54 covering the metal member 53 to follow deformation of the metal member 53, as shown in FIG. 6.

The diagonal and not vertical extension of the connection part 51 enlarges a length of the connection part 51, and thereby a movable range of the mounting part 52.

The connection of the mounting part 52 to the connection part 51 at the rear end 522 instead of the front end 521 facilitates adjustment of the position of the mounting part 52 to conform to the shape of the zygomatic region of the wearer.

The thin plate shape of the metal member 53 facilitates lateral deformation of the supporting part 25. This enables to move the mounting part 52 to conform to the size of the face of the wearer. In contrast, it exerts an elastic force in a vertical direction. This enables to absorb an impact force caused by hard exercise or other to prevent slip of the spectacles 10.

The distance between the left and right mounting parts 52 may be slightly narrower than the width of the face of the wearer. This enables the left and right mounting parts 52 to nip the face of the wearer, to prevent slip of the spectacles 10. At this time, elastic deformation of the connection parts 51 enables to prevent deformation of the temple body 24 causing the rear ends 42 to be apart from the temporal regions of the wearer.

The spectacles 10 are supported by the supporting part 25. Since the rear end 42 of the temple body 24 is just mounted on, but not secured to, the ear of the wearer, the spectacles 10 may pivot forward with the left and right mounting parts 52 functioning as fulcra.

However, the front ends 521 of the mounting parts 52 is enough forward with respect to a center of gravity of the spectacles 10 to restrain the pivoting movement of the spectacles 10.

Furthermore, the penetration of the hair of the wearer through the through hole 44 increases resistance against the pivoting movement to prevent levitation of the rear end 42 of the temple body 24 from the ear of the wearer, and thereby the pivoting movement of the spectacles 10, even when the wearer takes hard exercise.

The above described embodiments are examples to make it easier to understand the present invention. The present invention is not limited to the examples, and includes any modified, altered, added, or removed variations, without departing from the scope of the claims attached herewith. This can be easily understood by persons skilled in the art.

For example, the lenses are not limited to be without optical correction. They may be with optical correction, and they may be without shading function. The lenses may be separated into left and right parts, and they may be connected by a bridge. The lenses are not limited to be formed of plastics. They may be formed of glass or other material. However, light lenses are preferred, because heavy lenses tend to cause levitation of the rear end of the temple body.

The front is not limited to be rimless. It may be semi-rimless, or full-rim. As long as it has no nose pads, the front may have any other structure.

REFERENCE SIGNS LIST

10: Spectacles; 11: lens; 111: nose part; 12: spectacle frame; 21: front; 22a, 22b: endpiece; 221: base part; 222: upper part; 223: lower part; 23a, 23b: temple; 24: temple body; 25: supporting part; 26: securing member; 41, 511, 521: front end; 42, 512, 522: rear end; 43: protrusion; 44: through hole; 51: connection part; 513: curved part; 52: mounting part; 53: metal member; 54: resin; 80: wearer; 81: ear; 82: hair.

The invention claimed is:

1. A temple for a spectacle frame without nose pads, the temple comprising:
   an elongate body having a first end and a second end, the first end being configured to be connected to a front without nose pads, and the second end being configured to be mounted on an ear of a wearer; and
   a supporting part connected to the body, and configured to be mounted a zygomatic region of the wearer, the body having an elongate through hole extending along a longitudinal direction of the body near the second end, and
   levitation of the second end above the ear of the wearer being prevented by penetration of hair of the wearer through the through hole.

2. The temple of claim 1, wherein the through hole laterally pierces through the body.

3. The temple of claim 2, wherein the second end of the body has a protrusion extending along the longitudinal direction of the body on an upper side thereof, and
   wherein the through hole pierces through the protrusion.

4. The temple of claim 1, wherein the supporting part has:
   an elongate mounting part configured to be mounted on the zygomatic region of the wearer, and having a first end and a second end; and
   an elongate connection part connecting the mounting part to the body, and having a first end and a second end,
   wherein the first end of the connection part is connected to the body near the first end of the body, wherein the second end of the connection part is located backward, downward and inward with respect to the first end of the connection part, wherein the first end of the mounting part is connected to the second end of the connection part, and wherein the second end of the mounting part is located forward and downward with respect to the first end of the mounting part.

5. The temple of claim 4, wherein the supporting part is formed by a deformable metal member and a resin covering over the metal member.

6. A spectacle frame comprising:
a front without nose pads; and
a temple of claim 1 connected to the front.

* * * * *